(12) United States Patent
Lee et al.

(10) Patent No.: US 7,863,359 B2
(45) Date of Patent: Jan. 4, 2011

(54) METHOD OF PREPARING TRANSPARENT COPOLYMER RESIN, TRANSPARENT COPOLYMER RESIN PREPARED BY THE METHOD, AND RESIN BLEND COMPOSITION INCLUDING THE TRANSPARENT COPOLYMER RESIN

(75) Inventors: Seeun Lee, Seoul (KR); Chang Hun Han, Daejeon (KR); Daewoo Lee, Busan (KR)

(73) Assignee: LG Chem, Ltd. (KR)

( * ) Notice: Subject to any disclaimer, the term of this patent is extended or adjusted under 35 U.S.C. 154(b) by 1418 days.

(21) Appl. No.: 11/301,190

(22) Filed: Dec. 12, 2005

(65) Prior Publication Data

US 2006/0128848 A1 Jun. 15, 2006

(30) Foreign Application Priority Data

Dec. 11, 2004 (KR) .................. 10-2004-0104600

(51) Int. Cl.
*C07F 9/09* (2006.01)
(52) U.S. Cl. .................. 524/124; 524/556; 524/565
(58) Field of Classification Search .................. 524/124, 524/556, 565
See application file for complete search history.

(56) References Cited

U.S. PATENT DOCUMENTS 5,191,023 A * 3/1993 Iwamoto et al. ............. 525/314
6,417,306 B1 * 7/2002 Ueda et al. .................. 526/264

FOREIGN PATENT DOCUMENTS

| CN | 86 1 04340 | 1/1987 |
|----|----|----|
| CN | 1443789 | 9/2003 |
| JP | 63-162707 | 7/1988 |
| JP | 10-045850 | 2/1998 |
| JP | 2001-31833 | 2/2001 |
| JP | 2001-031833 | 2/2001 |
| JP | 2002-114886 | 4/2002 |
| KR | 2002-0003484 | 1/2002 |
| KR | 2003-0035480 | 5/2003 |
| KR | 10-2005-0044175 | 5/2005 |
| KR | 1020050044175 A * | 5/2005 |

OTHER PUBLICATIONS

PCT International Search Report; PCT/KR2005/004095; Dated: Mar. 10, 2006 (All references cited in the search report are listed above and JP2002-114886 has been filed).
Written Opinion of the International Search Authority of corresponding PCT application: PCT/KR2005/004095; Dated: Dec. 2, 2005.
Chinese Office Action; Application No. 200580041671.1; Date of Issuing: Apr. 3, 2009.
JP Office Action dated Dec. 18, 2009.

* cited by examiner

*Primary Examiner*—Robert D. Harlan
(74) *Attorney, Agent, or Firm*—Cantor Colburn LLP

(57) ABSTRACT

Provided are a method of preparing a transparent copolymer resin by continuous bulk polymerization of a polymerization mixture obtained by adding a phenol-based antioxidant and/or a phosphate-based antioxidant, a chain transfer agent, and an organic peroxide initiator to a monomer mixture including a styrene monomer, an acrylate monomer, and an acrylonitrile monomer, and a transparent copolymer resin prepared by the method, having good chemical resistance, fluidity, and discoloration resistance.

10 Claims, No Drawings

METHOD OF PREPARING TRANSPARENT COPOLYMER RESIN, TRANSPARENT COPOLYMER RESIN PREPARED BY THE METHOD, AND RESIN BLEND COMPOSITION INCLUDING THE TRANSPARENT COPOLYMER RESIN

CROSS-REFERENCE TO RELATED PATENT APPLICATION

This application claims priority from Korean Patent Application No. 10-2004-0104600, filed on Dec. 11, 2004, in the Korean Intellectual Property Office, the disclosure of which is incorporated herein in its entirety by reference.

FIELD OF THE INVENTION

The present invention relates to a method of preparing a transparent copolymer resin with good chemical resistance, fluidity, and discoloration resistance, and a transparent copolymer resin prepared by the method. More particularly, the present invention relates to a method of preparing a styrene-acrylonitrile-acrylate terpolymer transparent resin which is easily molded due to good fluidity, can be blended with various other compounds due to good chemical resistance, and hardly undergoes thermal discoloration due to good discoloration resistance, and a styrene-acrylonitrile-acrylate terpolymer transparent resin prepared by the method.

DESCRIPTION OF THE RELATED ART

Recently, as industries have advanced and products have become differentiated, studies for development of transparent materials in order to introduce nude fashion culture and pastel tone color culture into products to achieve a design revolution have actively progressed.

Industrially available transparent materials must satisfy various physical properties such as fluidity, discoloration resistance, or chemical resistance, in addition to their intrinsic transparency.

However, conventional resins are relatively easily discolored by heat, in spite of their own merits.

For example, PolyStyrene (PS), PolyMethyl Metha Acrylate (PMMA), and Styrene-AcryloNitrile (SAN) are commonly used as transparent resins. Polystyrene is mainly used as a material for food containers due to good transparency and fluidity. However, recently, there is an increasing need for a material capable of enhancing the transparency, drug resistance, and coloring of food containers. Thus, a SAN resin with good drug resistance and coloring is developed and widely used. However, the SAN resin is easily discolored by heat and thus exhibits poor coloring and transparency. A PMMA resin is widely used as an optical material due to excellent transparency. However, due to rapid polymerization and the high viscosity of a polymerization solution, it is difficult to prepare the PMMA resin by solution polymerization or bulk polymerization. Furthermore, the PMMA resin is easily discolored by thermal hysteresis during thermal processing, and has lower fluidity and chemical resistance than polystyrene.

In view of the above problems, an acrylonitrile-acrylic ester-styrene terpolymer is known as a transparent resin. The acrylonitrile-acrylic ester-styrene terpolymer may be used alone but is mainly grafted to or blended with a rubber resin such as an acrylonitrile-butadiene-styrene (ABS) resin.

Japanese Patent Laid-Open Publication No. 2001-31833 discloses a transparent resin composition which is obtained by compounding a rubber component with a copolymer of a styrene monomer, a methylmethacrylate monomer, and an acrylonitrile monomer, and offers better impact resistance.

Japanese Patent Laid-Open Publication No. 2002-114886 discloses a transparent resin composition with better impact resistance obtained by graft copolymerization of the styrene monomer, the methylmethacrylate monomer, and the acrylonitrile monomer onto the styrene-butadiene copolymer rubber.

The copolymer of the styrene monomer, the methylmethacrylate monomer, and the acrylonitrile monomer, and the graft copolymer of the styrene monomer, the methylmethacrylate monomer, and the acrylonitrile monomer, which are disclosed in the above patent documents, are mainly used to improve transparency, but may easily become yellowish by high evaporation temperature for removal of a monomer residue and a solvent or by heat during molding due to the presence of acrylonitrile and styrene with poor heat resistance.

Meanwhile, copolymer resins can be prepared by emulsion polymerization, suspension polymerization, solution polymerization, bulk polymerization, etc. As well known in the art, with respect to emulsion polymerization and suspension polymerization, it is easy to control a reaction temperature due to relatively easy removal of the heat of reaction, thereby reducing thermal degradation of polymers. However, additives such as an emulsifier, a viscosity enhancer, and a coagulating agent used during polymerization are left as impurities in final products, thereby degrading the physical properties of the products. Furthermore, after the polymerization, an additional process such as dehydration, coagulation, or drying for removal of water used as a reaction medium must be conducted, and removed water must be subjected to a waste water disposal, which make the emulsion polymerization and the suspension polymerization economically undesirable compared to continuous bulk polymerization.

On the other hand, with respect to solution polymerization and bulk polymerization, it is difficult to control the heat of reaction and the viscosity of a reaction solution. However, since no separate additives are used for polymerization, only a trace amount of impurities are left in final products, thereby ensuring good physical properties. Further, since a solvent used as a reaction medium and unreacted monomers are recovered and recycled after the polymerization, the solution polymerization and bulk polymerization impose much smaller production costs than the emulsion polymerization and suspension polymerization.

In this regard, bulk polymerization is more advantageous in various aspects provided that thermal adverse effects on bulk polymerization can be minimized.

Therefore, there is a need for development of a new polymerization process which can improve the physical properties of a copolymer of a styrene monomer, an acrylic ester monomer, and an acrylonitrile monomer which is known to have good transparency and to be easily blended with other resins, in particular by preventing thermal adverse effects on the copolymer.

SUMMARY OF THE INVENTION

The present invention provides a bulk polymerization method that can prevent a yellowing phenomenon at high temperature.

The present invention also provides a copolymer resin prepared by the polymerization method, having good transparency, drug resistance, fluidity, discoloration resistance, and coloring.

The present invention also provides a transparent resin blend including the copolymer resin, having good impact resistance, transparency, and coloring.

According to an aspect of the present invention, there is provided a method of preparing a transparent copolymer resin by continuous bulk polymerization of a mixture obtained by adding a phenol-based antioxidant and/or a phosphate-based antioxidant, a chain transfer agent, and an organic peroxide initiator to a monomer mixture including a styrene monomer, an acrylate monomer, and an acrylonitrile monomer.

According to another aspect of the present invention, there is provided a transparent copolymer resin prepared by the method.

According to still another aspect of the present invention, there is provided a transparent resin blend composition including the copolymer resin and an acrylonitrile-butadiene-styrene (ABS) resin.

According to a high-temperature bulk polymerization method of the present invention, a copolymer resin is prevented from yellowing, and is excellent in physical properties such as transparency, fluidity, drug resistance, discoloration resistance, and coloring. Thus, a resin blend composition obtained by blending the copolymer resin with other copolymer resin shows good impact resistance, coloring, and transparency.

DETAILED DESCRIPTION OF THE INVENTION

The present invention will now be described in more detail.

The present invention provides a method of preparing a transparent copolymer resin by continuous bulk polymerization of a polymerization mixture obtained by adding a phenol-based antioxidant and/or a phosphate-based antioxidant, a chain transfer agent, and an organic peroxide initiator to a monomer mixture including a styrene monomer, an acrylate monomer, and an acrylonitrile monomer.

In more detail, a styrene monomer, an acrylate monomer, and an acrylonitrile monomer are mixed with a reaction medium to obtain a monomer mixture. The monomer mixture may include 10 to 20 wt % of the styrene monomer, 50 to 60 wt % of the acrylate monomer, 3 to 15 wt % of the acrylonitrile monomer, and 20 to 30 wt % of the reaction medium.

The content of the styrene monomer may be 10 to 20 wt %. If the content of the styrene monomer is less than 10 wt %, the viscosity of a final reaction mixture may increase, thereby lowering the processibility and fluidity of products. On the other hand, if it exceeds 20 wt %, a refractive index may increase, thereby decreasing transparency.

The content of the acrylate monomer may be 50 to 60 wt %. If the content of the acrylate monomer is less than 50 wt %, a refractive index and a haze value may increase. On the other hand, if it exceeds 60 wt %, the viscosity of the reaction mixture may increase rapidly.

The content of the acrylonitrile monomer may be 3 to 15 wt %. If the content of the acrylonitrile monomer is less than 3 wt %, drug resistance may be remarkably reduced. On the other hand, if it exceeds 15 wt %, thermal discoloration may occur severely.

The content of the reaction medium may be 20 to 30 wt %. If the content of the reaction medium is less than 20 wt %, the viscosity of the reaction mixture may increase rapidly. On the other hand, if it exceeds 30 wt %, a molecular weight and production may be lowered.

When a polymer prepared by polymerization of the reaction mixture is blended with other polymer, the resultant polymer blend may become opaque. To prevent this phenomenon, the refractive index is controlled by adjusting the composition ratio of the components constituting the monomer mixture. A polymer prepared by polymerization of the monomer mixture with the above-described composition ratio has a good refractive index of about 1.515, and thus can be appropriately blended with various types of other polymers. This will be more fully supported by working examples illustrated herein.

The styrene monomer used in the preparation of the transparent copolymer resin of the present invention may be at least one selected from the group consisting of styrene and α-methylstyrene which are optionally substituted on the benzene nucleus by an alkyl group of $C_1$-$C_5$ or a halogen group.

The acrylate monomer used in the preparation of the transparent copolymer resin of the present invention may be at least one selected from the group consisting of methylacrylate, ethylacrylate, methylmethacrylate, ethylmethacrylate, methylethacrylate, and ethylethacrylate.

The acrylonitrile monomer used in the preparation of the transparent copolymer resin of the present invention may be at least one selected from the group consisting of acrylonitrile, methacrylonitrile, and ethacrylonitrile.

The reaction medium used herein may be at least one selected from the group consisting of aromatic hydrocarbon compounds of $C_6$-$C_9$ which are optionally substituted by an alkyl group of $C_1$-$C_3$ or a halogen group, and more preferably, at least one selected from the group consisting of ethylbenzene, toluene, and xylene.

A phenol-based antioxidant and/or a phosphate-based antioxidant, a chain transfer agent, and an organic peroxide initiator are added to the monomer mixture. Preferably, an organic peroxide initiator may be added in an amount of 0.01 to 0.1 parts by weight, a mixture of a hindered phenol antioxidant and a phosphite antioxidant may be added in an amount of 0.01 to 1 part by weight, and a chain transfer agent may be added in an amount of 0.01 to 1 part by weight, based on 100 parts by weight of the reactant mixture.

The content of the organic peroxide initiator may be 0.01 to 0.1 parts by weight based on 100 parts by weight of the reactant mixture. If the content of the organic peroxide initiator exceeds 0.1 parts by weight, polymerization reaction may occur rapidly, which makes it very difficult to control a reaction pressure and heat, and the viscosity of a reaction mixture may increase rapidly due to a gel effect. On the other hand, if it is less than 0.01 parts by weight, production may be lowered, and thermal discoloration may occur greatly due to a difference in composition ratio in polymers.

The mixture of the hindered phenol antioxidant and the phosphite antioxidant may be used in an amount of 0.01 to 1 part by weight based on 100 parts by weight of the reactant mixture to prevent a yellowing phenomenon at a high-temperature evaporation bath. If the content of the mixture of the hindered phenol antioxidant and the phosphite antioxidant exceeds 1 part by weight, a polymerization conversion rate may decrease, thereby increasing a refractive index. On the other hand, if it is less than 0.01 parts by weight, a yellowing phenomenon may occur due to thermal hysteresis at the high-temperature evaporation bath.

The mixture ratio of the hindered phenol antioxidant to the phosphite antioxidant may be 9:1 to 1:5, more preferably 5:1 to 1:3, and most preferably 2:1 to 1:2. If the content of the phosphite antioxidant is too high, a yellowing phenomenon may occur due to thermal hysteresis during polymerization. On the other hand, if the content of the phosphite antioxidant is too low, a yellowing phenomenon may occur due to thermal hysteresis in an evaporation bath and during processing.

When the hindered phenol antioxidant and the phosphite antioxidant are used in an appropriate mixture ratio, a polymer prepared by polymerization of the reaction mixture can have a low color b value of 1 or less. This will be more fully supported by working examples illustrated herein.

The content of the chain transfer agent may be 0.01 to 1 part by weight based on 100 parts by weight of the reactant mixture to appropriately adjust the viscosity and melt index (MI) of a copolymer resin. If the content of the chain transfer agent exceeds 1 part by weight, impact strength may be lowered due to low molecular weight. On the other hand, if it is less than 0.01 parts by weight, a process operation may be difficult due to high viscosity.

The organic peroxide initiator added to the monomer mixture may be at least one selected from the group consisting of 1,1-bis(t-butylperoxy)-3,3,5-trimethylcyclohexane, 1,1-bis(t-butylperoxy)cyclohexane, and 1,1-bis(t-butylperoxy)-2-methylcyclohexane.

The chain transfer agent added to the monomer mixture may be at least one thiol-based compound selected from the group consisting of tertiary dodecylmercaptan and n-octylmercaptan.

The mixture of the hindered phenol antioxidant and the phosphite antioxidant added to the monomer mixture may be a mixture of one hindered phenol antioxidant selected from the group consisting of tetrakis methylene 3-(3,5-di-t-butyl-4-hydroxyphenyl)propionate methane, 1,3,5-tris-(4-t-butyl-3-hydroxy-2,6-dimethylbenzyl)-1,3,5-triazine-2,4,6-(1H,3H,5H)-trione, and 1,3,5-tris-(3,5-di-t-butyl-4-hydroxybenzyl)-s-triazine-2,4,6-(1H,3H,5H)-trione, and one phosphite antioxidant selected from the group consisting of tris(2,4-t-butylphenyl)phosphite and tris(nonylphenyl)phosphite.

The present invention has illustrated that the above additives are added to the previously prepared monomer mixture and the resultant mixture is then introduced into a reactor. However, the additives can also be introduced into a reactor simultaneously with the monomer mixture. Also, there is no limitation to the sequence of the preparation of the monomer mixture and the addition of the additives.

Continuous bulk polymerization of the reaction mixture may be performed at a temperature of 120 to 140° C. for 2 to 4 hours and then at a temperature of 130 to 150° C. for 2 to 4 hours while introducing the reaction mixture into a reactor.

The primary polymerization of the continuous bulk polymerization may be performed at a temperature of 120 to 140° C. If the primary polymerization temperature exceeds 140° C., the molecular weight of a final polymer resin may be lowered. On the other hand, if it is less than 120° C., a polymerization initiation efficiency may be lowered, thereby lowering a polymerization conversion rate. The primary polymerization may be performed for 2 to 4 hours. If the primary polymerization duration exceeds 4 hours, a process operation may be difficult due to high viscosity. On the other hand, if it is less than 2 hours, a polymerization conversion rate may be lowered.

The secondary polymerization of the continuous bulk polymerization may be performed at a temperature of 130 to 150° C. If the secondary polymerization temperature exceeds 150° C., the molecular weight of a final polymer resin may be lowered. On the other hand, if it is less than 130° C., production may be lowered due to a low polymerization conversion rate. The secondary polymerization may be performed for 2 to 4 hours. If the secondary polymerization duration exceeds 4 hours, impact strength may be lowered due to a low molecular weight. On the other hand, if it is less than 2 hours, a refractive index may increase due to a low polymerization conversion rate.

When a polymerization conversion rate reaches about 60% or more, unreacted monomers and the reaction medium may be removed at a temperature of 200 to 240° C. in an evaporation bath to thereby obtain a pellet form of a transparent copolymer resin with good drug resistance, fluidity, and coloring.

A copolymer resin prepared by the method of the present invention has a haze value of 1 or less, a refractive index of 1.514 to 1.519, a melt index of 20 or more under 220° C.–10 kg load, a color b value of 1 or less, and good drug resistance.

The copolymer resin of the present invention can be blended with an acrylonitrile-butadiene-styrene (ABS) resin to prepare a resin blend composition. A resin blend composition includes 40 to 70 wt % of the copolymer resin and 30 to 60 wt % of an ABS resin. This resin blend composition has better impact resistance, in addition to the above-described good physical properties, and thus, can be widely used in various fields. If the content of the copolymer resin exceeds 70 wt %, impact resistance may be lowered. On the other hand, if it is less than 40 wt %, a haze value and a color b value may increase. To increase the transparency of the resin blend composition obtained by blending the copolymer resin with the ABS resin, the refractive index of the copolymer resin can be controlled by adjusting the composition ratios of the monomers constituting the copolymer resin.

Hereinafter, the present invention will be described more specifically with reference to the following Examples. The following Examples are for illustrative purposes and are not intended to limit the scope of the invention. It will be understood by those of ordinary skill in the art that various changes in form and details made without departing from the spirit of the present invention are within the scope of the present invention.

Example 1

17.48 wt % of styrene, 58.52 wt % of methylmethacrylate, and 4 wt % of acrylonitrile were dissolved in 20 wt % of toluene to obtain a mixed solution. 0.02 wt % of 1,1-bis(t-butylperoxy)-3,3,5-trimethylcyclohexane, 0.08 wt % of n-dodecylmercaptan, and 0.1 wt % of 1,3,5-tris(4-tert-butyl-3-hydroxy-2,6-dimethylbenzyl)-1,3,5-triazine-2,4,6-(1H,3H,5H)-trione used as a hindered phenol antioxidant were added to the mixed solution to obtain a polymerization solution. Then, polymerization was performed at a temperature of 140° C. in a first reactor with 26 L capacity and then at a temperature of 150° C. in a second reactor with 26 L capacity while feeding the polymerization solution at a rate of 14 L/hr. When a polymerization conversion rate reached about 60% or more, unreacted monomers and toluene used as a reaction medium were removed at a temperature of 215° C. in an evaporation bath to thereby obtain a transparent copolymer resin in a pellet form.

Example 2

17.48 wt % of styrene, 58.52 wt % of methylmethacrylate, and 4 wt % of acrylonitrile were dissolved in 20 wt % of toluene to obtain a mixed solution. 0.02 wt % of 1,1-bis(t-butylperoxy)-3,3,5-trimethylcyclohexane, 0.08 wt % of n-dodecyl mercaptan, and 0.1 wt % of a 2:1 mixture of 1,3,5-tris(4-tert-butyl-3-hydroxy-2,6-dimethylbenzyl)-1,3,5-triazine-2,4,6-(1H,3H,5H)-trione used as a hindered phenol antioxidant and tris(2,4-di-t-butylphenyl)phosphite used as a phosphite antioxidant were added to the mixed solution to obtain a polymerization solution. Then, polymerization was performed at a temperature of 140° C. in a first reactor with 26

L capacity and then at a temperature of 150° C. in a second reactor with 26 L capacity while feeding the polymerization solution at a rate of 14 L/hr. When a polymerization conversion rate reached about 60% or more, unreacted monomers and toluene used as a reaction medium were removed at a temperature of 215*C in an evaporation bath to thereby obtain a transparent copolymer resin in a pellet form.

Example 3

17.48 wt % of styrene, 58.52 wt % of methylmethacrylate, and 4 wt % of acrylonitrile were dissolved in 20 wt % of toluene to obtain a mixed solution. 0.02 wt % of 1,1-bis(t-butylperoxy)-3,3,5-trimethylcyclohexane, 0.08 wt % of n-dodecylmercaptan, and 0.1 wt % of a 1:1 mixture of 1,3,5-tris(4-tert-butyl-3-hydroxy-2,6-dimethylbenzyl)-1,3,5-triazine-2,4,6-(1H,3H,5H)-trione used as a hindered phenol antioxidant and tris(2,4-di-t-butylphenyl)phosphite used as a phosphite antioxidant were added to the mixed solution to obtain a polymerization solution. Then, polymerization was performed at a temperature of 140° C. in a first reactor with 26 L capacity and then at a temperature of 150° C. in a second reactor with 26 L capacity while feeding the polymerization solution at a rate of 14 L/hr. When a polymerization conversion rate reached about 60% or more, unreacted monomers and toluene used as a reaction medium were removed at a temperature of 215° C. in an evaporation bath to thereby obtain a transparent copolymer resin in a pellet form.

Example 4

17.48 wt % of styrene, 58.52 wt % of methylmethacrylate, and 4 wt % of acrylonitrile were dissolved in 20 wt % of toluene to obtain a mixed solution. 0.02 wt % of 1,1-bis(t-butylperoxy)-3,3,5-trimethylcyclohexane, 0.08 wt % of n-dodecylmercaptan, and 0.1 wt % of tris(2,4-di-t-butylphenyl)phosphite used as a phosphite antioxidant were added to the mixed solution to obtain a polymerization solution. Then, polymerization was performed at a temperature of 140° C. in a first reactor with 26 L capacity and then at a temperature of 150° C. in a second reactor with 26 L capacity while feeding the polymerization solution at a rate of 14 L/hr. When a polymerization conversion rate reached about 60% or more, unreacted monomers and toluene used as a reaction medium were removed at a temperature of 215° C. in an evaporation bath to thereby obtain a transparent copolymer resin in a pellet form.

Example 5

17.11 wt % of styrene, 57.29 wt % of methylmethacrylate, and 8 wt % of acrylonitrile were dissolved in 20 wt % of toluene to obtain a mixed solution. 0.02 wt % of 1,1-bis(t-butylperoxy)-3,3,5-trimethylcyclohexane, 0.04 wt % of n-dodecylmercaptan, and 0.2 wt % of a 2:1 mixture of 1,3,5-tris(4-tert-butyl-3-hydroxy-2,6-dimethylbenzyl)-1,3,5-triazine-2,4,6-(1H,3H, 5H)-trione used as a hindered phenol antioxidant and tris(2,4-di-t-butylphenyl)phosphite used as a phosphite antioxidant were added to the mixed solution to obtain a polymerization solution. Then, polymerization was performed at a temperature of 140° C. in a first reactor with 26 L capacity and then at a temperature of 150° C. in a second reactor with 26 L capacity while feeding the polymerization solution at a rate of 14 L/hr. When a polymerization conversion rate reached about 60% or more, unreacted monomers and toluene used as a reaction medium were removed at a temperature of 215° C. in an evaporation bath to thereby obtain a transparent copolymer resin in a pellet form.

Comparative Example 1

17.48 wt % of styrene, 58.52 wt % of methylmethacrylate, and 4 wt % of acrylonitrile were dissolved in 20 wt % of toluene to obtain a mixed solution. 0.02 wt % of 1,1-bis(t-butylperoxy)-3,3,5-trimethylcyclohexane and 0.08 wt % of n-dodecyl mercaptan were added to the mixed solution to obtain a polymerization solution. Then, polymerization was performed at a temperature of 140° C. in a first reactor with 26 L capacity and then at a temperature of 150° C. in a second reactor with 26 L capacity while feeding the polymerization solution at a rate of 14 L/hr. When a polymerization conversion rate reached about 60% or more, unreacted monomers and toluene used as a reaction medium were removed at a temperature of 215° C. in an evaporation bath to thereby obtain a transparent copolymer resin in a pellet form.

Comparative Example 2

16.56 wt % of styrene, 55.44 wt % of methylmethacrylate, and 8.0 wt % of acrylonitrile were dissolved in 20 wt % of toluene to obtain a mixed solution. 0.02 wt % of 1,1-bis(t-butylperoxy)-3,3,5-trimethylcyclohexane and 0.04 wt % of n-dodecyl mercaptan were added to the mixed solution to obtain a polymerization solution. Then, polymerization was performed at a temperature of 140° C. in a first reactor with 26 L capacity and then at a temperature of 150° C. in a second reactor with 26 L capacity while feeding the polymerization solution at a rate of 14 L/hr. When a polymerization conversion reached about 60% or more, unreacted monomers and toluene used as a reaction medium were removed at a temperature of 215° C. in an evaporation bath to thereby obtain a transparent copolymer resin in a pellet form.

Experimental Examples

The physical properties of the transparent copolymer resins prepared in Examples and Comparative Examples were evaluated as follows, and the results are summarized in Table 1 below.

Drug Resistance 3.2 mm thick, bar-shaped samples made by injection molding were fixedly placed on jigs of 226.97 mm radius, the ends of which were bent. Gauzes stained with soybean oil were placed on the center portions of the samples and left for 24 hours so that the soybean oil permeated into the samples. After 24 hours, appearances (the presence of cracks, etc.) of the samples were observed with naked eyes, and a change in thickness of the samples before and after the test was measured.

(⊚: no change, ○: color changed, Δ: crack formation/severe surface change, ×: unavailable)

Refractive Index

The pellets were made into films, and the refractive indices of the films were measured according to ASTM D1298.

Color b Value

The color b value was measured according to ASTM D2985.

Haze Value

The haze value was measured according to ASTM1003.

Melt Index (MI)

The melt index was measured according to ASTM D1238.

TABLE 1

| Section | Example 1 | Example 2 | Example 3 | Example 4 | Example 5 | Comparative Example 1 | Comparative Example 2 |
|---|---|---|---|---|---|---|---|
| Acrylonitrile monomer (wt %) | 4 | 4 | 4 | 4 | 8 | 4 | 8 |
| Phenol antioxidant/ Phosphite antioxidant | 1:0 | 2:1 | 1:1 | 0:1 | 2:1 | 0 | 0 |
| Refractive index | 1.5162 | 1.5163 | 1.5166 | 1.5170 | 1.5172 | 1.5160 | 1.5165 |
| Conversion (%) | 67 | 65 | 62 | 60 | 62 | 72 | 75 |
| Haze value | 0.3 | 0.33 | 0.4 | 0.45 | 0.4 | 0.3 | 0.4 |
| Color   L | 95.42 | 95.41 | 95.39 | 95.07 | 95.25 | 95.48 | 95.25 |
|         b | 1.5 | 0.8 | 1.2 | 1.6 | 1.0 | 2.0 | 2.8 |
| Weight average molecular weight (Mw) | 94,721 | 96,340 | 98,598 | 99,010 | 104,232 | 91,230 | 101,000 |
| Drug resistance | ◎ | ◎ | ◎ | ◎ | ◎ | ◎ | ◎ |
| Ml | 39 | 38 | 35 | 34 | 45 | 41 | 50 |

As can be seen from Table 1, the transparent copolymer resins prepared in Examples 1 through 5 according to the present invention exhibited a haze value of 1 or less, a refractive index of 1.515 to 1.518, a melt index of 20 or more under 10 kg load at 220° C., and in particular, a very low color b value of about 1. These results reveal that the transparent copolymer resins prepared in Examples 1-5 according to the present invention have better drug resistance, fluidity, coloring, and discoloration resistance than those prepared in Comparative Examples 1-2 according to conventional techniques.

According to a high-temperature bulk polymerization method of the present invention, a copolymer resin is prevented from yellowing, and is excellent in physical properties such as transparency, fluidity, drug resistance, discoloration resistance, and coloring. Thus, a resin blend composition obtained by blending the copolymer resin with other copolymer resin can have good impact resistance, coloring, and transparency.

What is claimed is:

1. A method of preparing a transparent copolymer resin comprising:
   (a) mixing 10 to 20 wt % of a styrene monomer, 50 to 60 wt % of an acrylate monomer, 3 to 15 wt % of an acrylonitrile monomer, and 20 to 30 wt % of a reaction medium to prepare a reactant mixture;
   (b) adding to the reactant mixture 0.01 to 0.1 parts by weight of an organic peroxide initiator, 0.01 to 1 part by weight of a hindered phenol antioxidant and a phosphite antioxidant, and 0.01 to 1 part by weight of a chain transfer agent based on 100 parts by weight of the reactant mixture to prepare a polymerization mixture; and
   (c) performing continuous bulk polymerization at a temperature range of 120 to 140° C. for 2 to 4 hours and then at a temperature range of 130 to 150° C. for 2 to 4 hours while introducing the polymerization mixture into a reactor.

2. The method of claim 1, wherein the styrene monomer is at least one selected from the group consisting of styrene and α-methylstyrene which are optionally substituted on the benzene nucleus by an alkyl group of $C_1$-$C_5$ or a halogen group.

3. The method of claim 1, wherein the acrylate monomer is at least one selected from the group consisting of methylacrylate, ethylacrylate, methylmethacrylate, ethylmethacrylate, methylethacrylate, and ethylethacrylate.

4. The method of claim 1, wherein the acrylonitrile monomer is at least one selected from the group consisting of acrylonitrile, methacrylonitrile, and ethacrylonitrile.

5. The method of claim 1, wherein the reaction medium is at least one selected from the group consisting of aromatic hydrocarbon compounds of $C_6$-$C_9$ which are optionally substituted by an alkyl group of $C_1$-$C_3$ or a halogen group.

6. The method of claim 1, wherein the organic peroxide initiator is at least one selected from the group consisting of 1,1-bis(t-butylperoxy)-3,3,5-trimethylcyclohexane, 1,1-bis(t-butylperoxy)cyclohexane, and 1,1-bis(t-butylperoxy)-2-methylcyclohexane.

7. The method of claim 1, wherein the chain transfer agent is at least one thiol-based compound selected from the group consisting of tertiary dodecylmercaptan and n-octylmercaptan.

8. The method of claim 1, wherein the hindered phenol antioxidant is one selected from the group consisting of tetrakis methylene 3-(3,5-di-t-butyl-4-hydroxyphenyl)propionate methane, 1,3,5-tris-(4-t-butyl-3-hydroxy-2,6-dimethylbenzyl)-1,3,5-triazine-2,4,6-(1H, 3H,5H)-trione, and 1,3,5-tris(3,5-di-t-butyl-4-hydroxybenzyl)-s-triazine-2,4,6-(1H, 3H,5H)-trione, and the phosphite antioxidant is one selected from the group consisting of tris(2,4-t-butylphenyl)phosphite and tris(nonylphenyl)phosphite.

9. The method of claim 1, wherein the mixture ratio of the hindered phenol antioxidant to the phosphite antioxidant is 2:1 to 1:1.

10. The method of claim 1, wherein operations (a) and (b) are performed in any sequence.

* * * * *